US010827899B2

United States Patent
Hu (10) Patent No.: US 10,827,899 B2
(45) Date of Patent: Nov. 10, 2020

(54) MULTIMEDIA INTELLIGENT CLEANING SYSTEM AND CONTROL METHOD THEREOF

(71) Applicant: ECOVACS ROBOTICS CO., LTD., Suzhou (CN)

(72) Inventor: Jianfeng Hu, Changzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 159 days.

(21) Appl. No.: 16/112,674

(22) Filed: Aug. 25, 2018

(65) Prior Publication Data

US 2019/0059678 A1  Feb. 28, 2019

(30) Foreign Application Priority Data

Aug. 25, 2017  (CN) .......................... 2017 1 0744002

(51) Int. Cl.
| | | |
|---|---|---|
| A47L 11/40 | (2006.01) | |
| A47L 1/02 | (2006.01) | |
| A47L 11/38 | (2006.01) | |
| G05D 1/00 | (2006.01) | |
| H01R 13/213 | (2006.01) | |
| H01R 13/6582 | (2011.01) | |

(Continued)

(52) U.S. Cl.
CPC .............. *A47L 11/4011* (2013.01); *A47L 1/02* (2013.01); *A47L 11/38* (2013.01); *G05D 1/0055* (2013.01); *G05D 1/0088* (2013.01); *H01R 13/213* (2013.01); *H01R 13/6582* (2013.01); *H01R 13/6683* (2013.01); *H01R 13/717* (2013.01); *A47L 2201/00* (2013.01); *A47L 2201/04* (2013.01); *G05D 2201/0203* (2013.01)

(58) Field of Classification Search
None
See application file for complete search history.

(56) References Cited

U.S. PATENT DOCUMENTS

| | | | |
|---|---|---|---|
| 5,558,210 | A | 9/1996 | Jonischus |
| 5,604,954 | A | 2/1997 | Webster et al. |

FOREIGN PATENT DOCUMENTS

| | | | |
|---|---|---|---|
| CN | 200978517 | * | 11/2007 |
| CN | 201057999 Y | | 5/2008 |
| CN | 201939278 U | | 8/2011 |

(Continued)

*Primary Examiner* — David Redding
(74) *Attorney, Agent, or Firm* — Maschoff Brennan (57) ABSTRACT

A multimedia intelligent cleaning system and a control method thereof may include a self-propelled cleaning robot for cleaning a working surface and a safety guard device for connection with the self-propelled cleaning robot. The self-propelled cleaning robot and the safety guard device are detachably connected with each other through a securing assembly. The securing assembly has a first state in which the safety guard device is connected with the self-propelled cleaning robot and a second state in which the safety guard device is separated from the self-propelled cleaning robot. The multimedia intelligent cleaning system further comprises a detection assembly for detecting whether the securing assembly is in the first state or the second state, and a control unit for controlling whether the self-propelled cleaning robot enters a safe activation state depending on a detection signal from the detection assembly.

20 Claims, 8 Drawing Sheets

(51) Int. Cl.
*H01R 13/66* (2006.01)
*H01R 13/717* (2006.01)

(56) References Cited

FOREIGN PATENT DOCUMENTS

| | | |
|---|---|---|
| CN | 202591234 U | 12/2012 |
| CN | 205144461 U | 4/2016 |
| CN | 206049309 U | 3/2017 |

\* cited by examiner

MULTIMEDIA INTELLIGENT CLEANING SYSTEM AND CONTROL METHOD THEREOF

RELATED APPLICATION

This application claims the benefit under 35 U.S.C. § 119 of CN patent application No. 201710744002.5, filed on Aug. 25, 2017, the entire disclosures and contents of which are hereby incorporated by reference herein.

FIELD

The embodiments discussed herein are related to a multimedia intelligent cleaning system and a control method thereof.

BACKGROUND

Current cleaning robots that are employed to clean vertical wall surfaces may require or use a connection with a safety rope to prevent the cleaning robot from falling. The connection state of the safety rope, however, may not be detected by current cleaning robots. In some cases, current cleaning robots may fall off in the event of a loose connection with the safety rope, thereby potentially posing a safety risk.

The subject matter claimed herein is not limited to embodiments that solve any disadvantages or that operate only in environments such as those described above. Rather, this background is only provided to illustrate one example technology area where some embodiments described herein may be practiced.

SUMMARY

A multimedia intelligent cleaning system may include a self-propelled cleaning robot for cleaning a working surface. Additionally, the multimedia intelligent cleaning system may include a safety guard device to connect with the self-propelled cleaning robot in which the self-propelled cleaning robot and the safety guard device are detachably connected with each other through a securing assembly, and in which the securing assembly has a first state in which the safety guard device is connected with the self-propelled cleaning robot and a second state in which the safety guard device is separated from the self-propelled cleaning robot. Additionally, the multimedia intelligent cleaning system may include a detection assembly to detect whether the securing assembly is in the first state or the second state. The multimedia intelligent cleaning system may also include a control unit to control whether the self-propelled cleaning robot enters a safe activation state depending on a detection signal from the detection assembly.

BRIEF DESCRIPTION OF THE DRAWINGS

Example embodiments will be described and explained with additional specificity and detail through the use of the accompanying drawings in which.

DESCRIPTION OF EXAMPLE EMBODIMENTS

According to aspects of the present disclosure, a multimedia intelligent cleaning system and a control method thereof may help to avoid a problem stemming from, among other things, a loose connection between existing cleaning robots and an associated safety rope that may lead to falling of the cleaning robots and/or an increased risk of falling.

The multimedia intelligent cleaning system may include a self-propelled cleaning robot for cleaning a working surface and a safety guard device for connection with the self-propelled cleaning robot. The self-propelled cleaning robot and the safety guard device may be detachably connected with each other through a securing assembly. The securing assembly may have a first state in which the safety guard device is connected with the self-propelled cleaning robot and a second state in which the safety guard device is separated from the self-propelled cleaning robot. The multimedia intelligent cleaning system may further include a detection assembly for detecting whether the securing assembly is in the first state or the second state, and a control unit for controlling whether the self-propelled cleaning robot enters a safe activation state depending on a detection signal from the detection assembly.

As a further improvement of the present disclosure, the securing assembly may include a plug-in connector fixedly connected with the safety guard device and a fixed base arranged within the self-propelled cleaning robot. In these or other embodiments, the plug-in connector and the fixed base may cooperate with each other. For example, the plug-in connector and the fixed based may be fixed together when the securing assembly is in the first state, and the plug-in connector and the fixed base may be separated from each other when the securing assembly is in the second state.

As a further improvement of the present disclosure, the plug-in connector may have a first direction of action for insertion into the fixed base and a second direction of action for movement within the fixed base. In these or other embodiments, the first direction of action may be perpendicular to a reference plane, and the second direction of action may be parallel with the reference plane.

As a further improvement of the present disclosure, the reference plane may be parallel with a working surface. Alternatively, in some embodiments the reference plane may be perpendicular to the working surface.

As a further improvement of the present disclosure, the fixed base may be provided thereon with an abutting portion that may be arranged in such a way that the abutting portion may block movement of the plug-in connector in the second direction of action when the securing assembly is in the first state.

As a further improvement of the present disclosure, the plug-in connector may include a plug-in rod with one end being fixed with the safety guard device, and an abutting block located on the other end of the plug-in rod and extending radially outwards along the plug-in rod.

As a further improvement of the present disclosure, an insertion opening for insertion of the plug-in rod and the abutting block may be formed on the fixed base.

As a further improvement of the present disclosure, formed on the fixed base may be a receding portion communicated with the insertion opening to make way for the abutting block when the plug-in connector is inserted. Additionally or alternatively, an abutting portion may be communicated with and radially spaced a certain distance from the receding portion. In these or other embodiments, the abutting portion may be arranged in such a way that when the securing assembly is in the first state, the abutting block may cooperate with the abutting portion to fix the plug-in connector.

As a further improvement of the present disclosure, the detection assembly may include a microswitch arranged in such a way that the microswitch may be triggered when the abutting block cooperates with the abutting portion.

As a further improvement of the present disclosure, the detection assembly may include a shield and a sensor arranged within the fixed base. In these or other embodiments, the shield may have an exposure position where the sensor is exposed and a shielding position where the sensor is shielded. In some embodiments, the shielding position and the exposure position of the shield may correspond to the first state and the second state, respectively, of the securing assembly.

As a further improvement of the present disclosure, the detection assembly further may include an elastic member. In these or other embodiments, the elastic member may be positioned between the shield and the fixed base. Additionally or alternatively, the plug-in connector, when inserted into the fixed base, may abut against the shield so as to cause displacement of the shield.

As a further improvement of the present disclosure, the detection assembly may include a first wiring board and a second wiring board arranged to be spaced from each other. In these or other embodiments, the plug-in connector may include a conductive material, and the plug-in connector may be electrically connected with the first wiring board and the second wiring board when the securing assembly is in the first state.

As a further improvement of the present disclosure, when the securing assembly is in the first state, a first position of the securing assembly may be electrically connected with the first wiring board, and a second position of the securing assembly may be electrically connected with the second wiring board. In these or other embodiments, the first position and the second position may be two different positions on the securing assembly.

As a further improvement of the present disclosure, the securing assembly may include a plug-in connector fixedly connected with the safety guard device and a fixed base arranged within the self-propelled cleaning robot. In these or other embodiments, the plug-in connector and the fixed base may cooperate with each other and thus may be fixed together when the securing assembly is in the first state, and the plug-in connector and the fixed base may be separated from each other when the securing assembly is in the second state. Additionally or alternatively, the fixed base may include a flange plate and a fixed support. In some embodiments, an insertion opening may be arranged on the flange plate, and the first wiring board and the second wiring board may be positioned between the flange plate and the fixed support. In some embodiments, the plug-in connector may be inserted into the insertion opening along the first direction of action and may be electrically connected with the first wiring board. In some embodiments, the plug-in connector, when being electrically connected with the first wiring board, may move along the second direction of action to be electrically connected with the second wiring board, and thereby cooperate with and affix to the fixed base.

As a further improvement of the present disclosure, the fixed support may include a mounting surface. In these or other embodiments, the first wiring board may be parallel with the mounting surface, and the second wiring board may be perpendicular to the mounting surface.

As a further improvement of the present disclosure, the fixed support may include an annular sidewall extending from the mounting surface along a direction towards the flange plate. In these or other embodiments, a first opening may be formed on the annular sidewall, and the first wiring board may be partially disposed within the annular sidewall through the first opening and partially positioned outwardly of the annular sidewall. Additionally or alternatively, a second opening and a third opening may be formed on the annular sidewall. In some embodiments, the second wiring board may enter into the annular sidewall through the second opening and may then extend out of the annular sidewall through the third opening, such that both ends of the second wiring board may be positioned outwardly of the annular sidewall and a middle portion thereof positioned inwardly of the annular sidewall.

As a further improvement of the present disclosure, arranged on a first end of the second wiring board may be a blocking structure for blocking entrance of the first end into the annular sidewall.

As a further improvement of the present disclosure, two retaining walls may be arranged outwardly of the annular sidewall, and a space corresponding to the second wiring board may be formed between the two retaining walls. In these or other embodiments, the space may be communicated with the third opening.

As a further improvement of the present disclosure, the self-propelled cleaning robot in the multimedia intelligent cleaning system may include a glass-wiping robot, a solar cell panel cleaning robot, or the like.

As a further improvement of the present disclosure, the control method of the multimedia intelligent cleaning system may include: controlling, by the control unit, entrance of the self-propelled cleaning robot into a safe activation state if the detection unit detects that the securing assembly is in the first state.

As a further improvement of the present disclosure, controlling, by the control unit, entrance of the self-propelled cleaning robot into a safe activation state if the detection unit detects that the securing assembly is in the first state may include the control unit waiting for a first time period upon the first receipt of a detection signal that the detection unit detects that the securing assembly is in the first state. Additionally or alternatively, controlling, by the control unit, entrance of the self-propelled cleaning robot into a safe activation state if the detection unit detects that the securing assembly is in the first state may include when, within the first time period, the detection unit detecting that the securing assembly is always in the first state.

Accordingly, aspects of the present disclosure may have the following advantageous effect that, in accordance with the multimedia intelligent cleaning system and the control method thereof, the risk of falling that can result from a loose connection between the safety guard device and the self-propelled cleaning robot can be reduced by arranging the detection assembly to detect the state of the securing assembly and also by utilizing the control unit to control, depending on detection results, whether the self-propelled cleaning robot enters the safe activation state. The multimedia intelligent cleaning system in the present disclosure may thus improve intelligence and/or safety of cleaning systems described herein.

Embodiments of the present disclosure will be explained with reference to the accompanying drawings.

As illustrated in FIG. 1 to FIG. 9, the multimedia intelligent cleaning system of the present disclosure may include a self-propelled cleaning robot 1, a safety guard device for connection with the self-propelled cleaning robot 1, a securing assembly 3 arranged between the self-propelled cleaning robot 1 and the safety guard device, a detection assembly 4 and a control unit.

Figure 1:
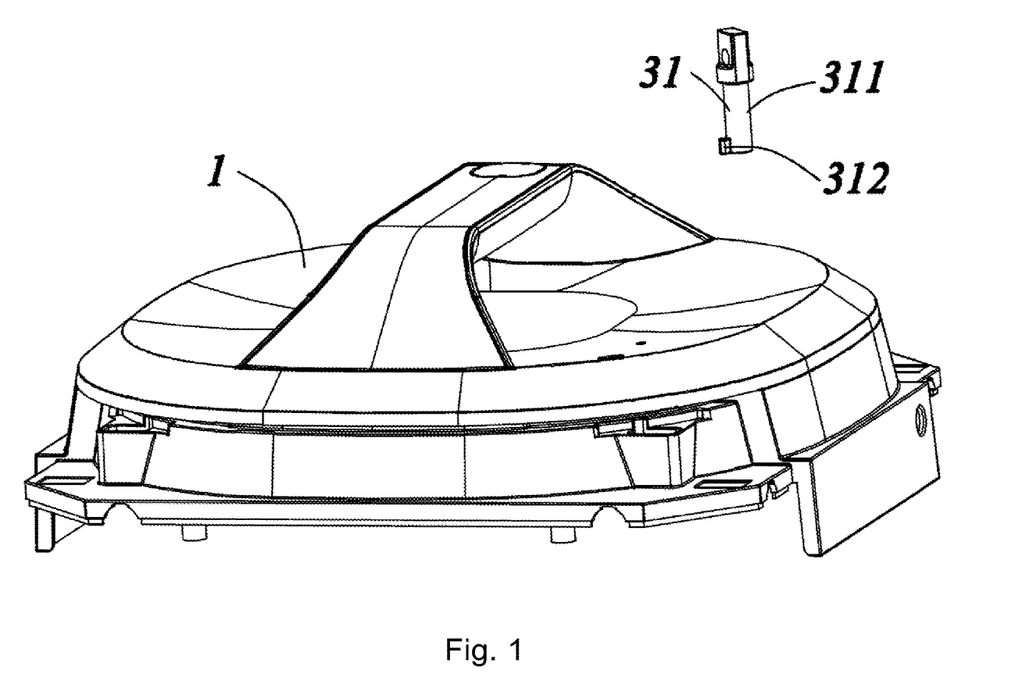
FIG. 1 illustrates an example structural schematic view illustrating an example self-propelled cleaning robot and an example plug-in connector of an example multimedia intelligent cleaning system.
Figure 2:
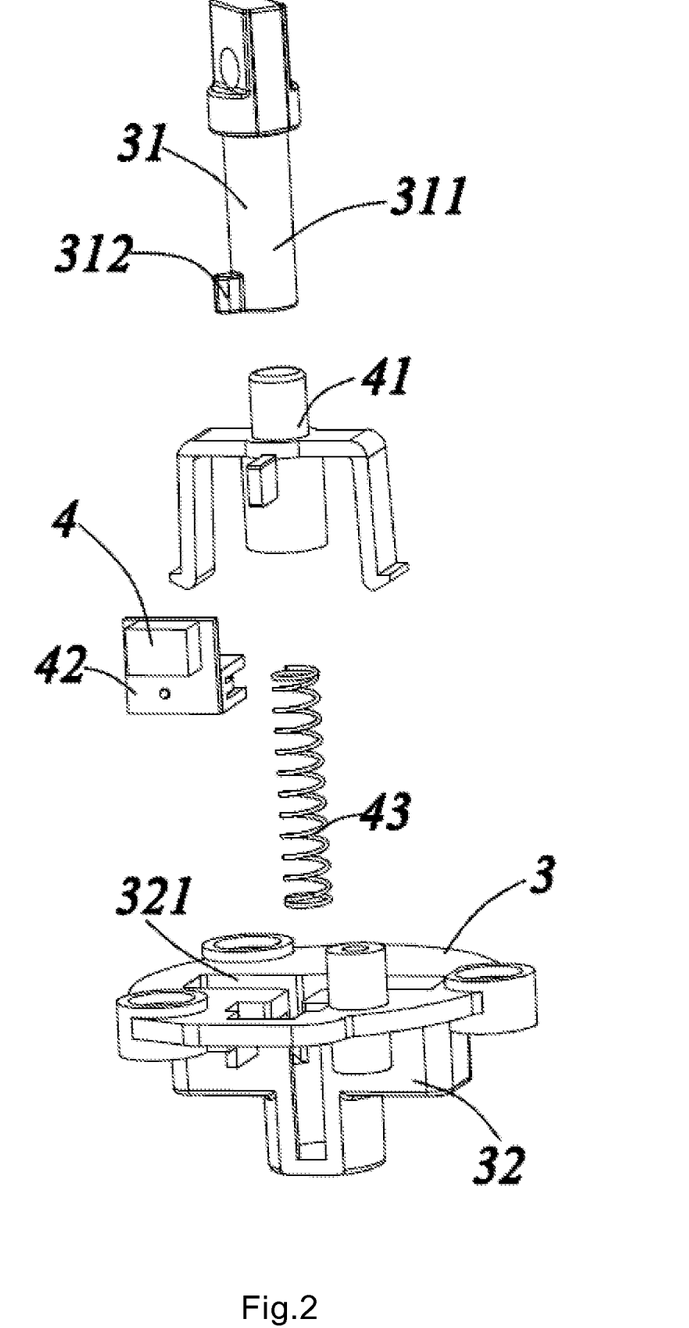
FIG. 2 illustrates an example structural schematic view illustrating an example securing assembly and an example detection assembly in an example first embodiment.

The safety guard device may include an attachment for fixation to a wall surface and a safety rope for connection with the attachment and the self-propelled cleaning robot 1. The safety guard device may help to prevent the self-propelled cleaning robot 1 from falling, by timely pulling up the self-propelled cleaning robot 1 in the case of its disengagement from a working surface.

The securing assembly 3 may have a first state in which the safety guard device is connected with the self-propelled cleaning robot 1 and a second state in which the safety guard device is separated from the self-propelled cleaning robot 1. The detection assembly 4 may detect the state of the securing assembly 3. Additionally or alternatively, the control unit may control, depending on a detection signal from the detection assembly 4, whether the self-propelled cleaning robot 1 has entered a safe activation state. In particular, the control unit may control the self-propelled cleaning robot to enter the safe activation state when the presence of the first state is detected. The safe activation state may, in some embodiments, be a recommended (e.g., suggested or required) state to control the self-propelled cleaning robot 1 and/or such that the self-propelled cleaning robot functions (e.g., as in a safety mechanism). Upon entrance of the self-propelled cleaning robot 1 into the safe activation state, the self-propelled cleaning robot 1 can be controlled to function by further pressing down an activation button, and/or the self-propelled cleaning robot 1 can function when it enters the safe activation state following the pressing of the activation button. When the presence of the second state is detected, the self-propelled cleaning robot 1 may not enter the safe activation state. For example, the self-propelled cleaning robot 1 may not move or function over the working surface even though the activation button is pressed down.

If the securing assembly 3 is in the first state, then it may be determined that the safety guard device and the self-propelled cleaning robot 1 may be properly connected, at which point the control unit may control the self-propelled cleaning robot 1 to enter the safe activation state. With further operations, users may be capable of controlling the self-propelled cleaning robot 1 to function. Then, the self-propelled cleaning robot 1 may be placed over the working surface to clean it. And when the securing assembly 3 is in the second state, it may be determined that the safety guard device and the self-propelled cleaning robot 1 may not be connected with each other and/or may not be properly connected, at which point the self-propelled cleaning robot 1 may not be able to enter the safe activation state and users may be asked or notified to check the securing assembly 3. The self-propelled cleaning robot 1 can be activated after the securing assembly 3 is operated to enter the first state. By doing so, falling of the self-propelled cleaning robot 1 that arises from failure to fix with the safety guard device can be avoided and/or a risk thereof reduced.

The securing assembly 3 may include a plug-in connector 31 fixedly connected with the safety guard device and a fixed base 32 arranged within the self-propelled cleaning robot 1. In these or other embodiments, the plug-in connector 31 and the fixed base 32 may cooperate with each other and thus may be fixed together when the securing assembly 3 is in the first state. Additionally or alternatively, the plug-in connector 31 and the fixed base 32 may be separated from each other when the securing assembly 3 is in the second state.

The plug-in connector 31 may include a plug-in rod 311 with one end being fixed with the safety guard device, and an abutting block 312 may be located on the other end of the plug-in rod 311 and may extend radially outwards along the plug-in rod 311. An insertion opening 321 for insertion of the plug-in rod 311 and the abutting block 312 may be formed on the fixed base 32.

Formed on the fixed base 32 may be a receding portion 322 communicated with the insertion opening 321 to make way for (e.g., receive) the abutting block 312 when the plug-in connector 31 is inserted. Additionally or alternatively, an abutting portion 323 may be communicated with and radially spaced a certain distance from the receding portion 322. In these or other embodiments, when the securing assembly 3 is in the first state, the abutting block 312 may cooperate with the abutting portion 323 to fix the plug-in connector 31.

Figure 4:
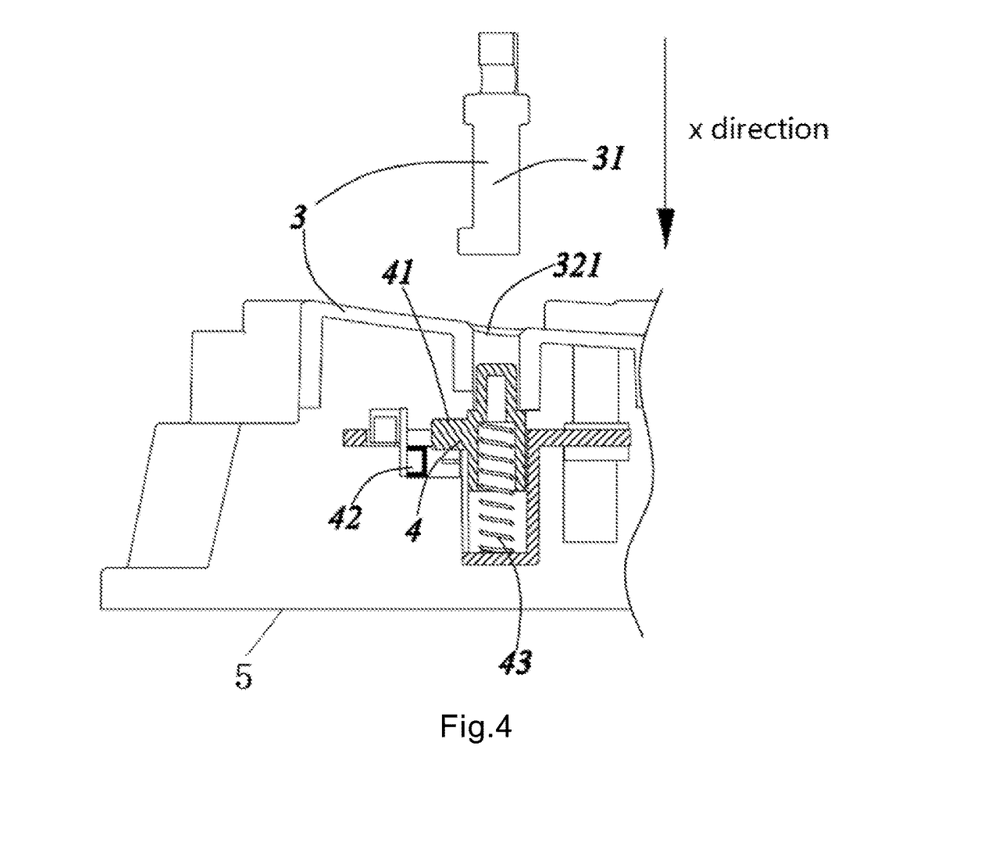
FIG. 4 illustrates an example schematic section view of an example first implementation structure of an example securing assembly in an example second state in the first embodiment.
Figure 5:
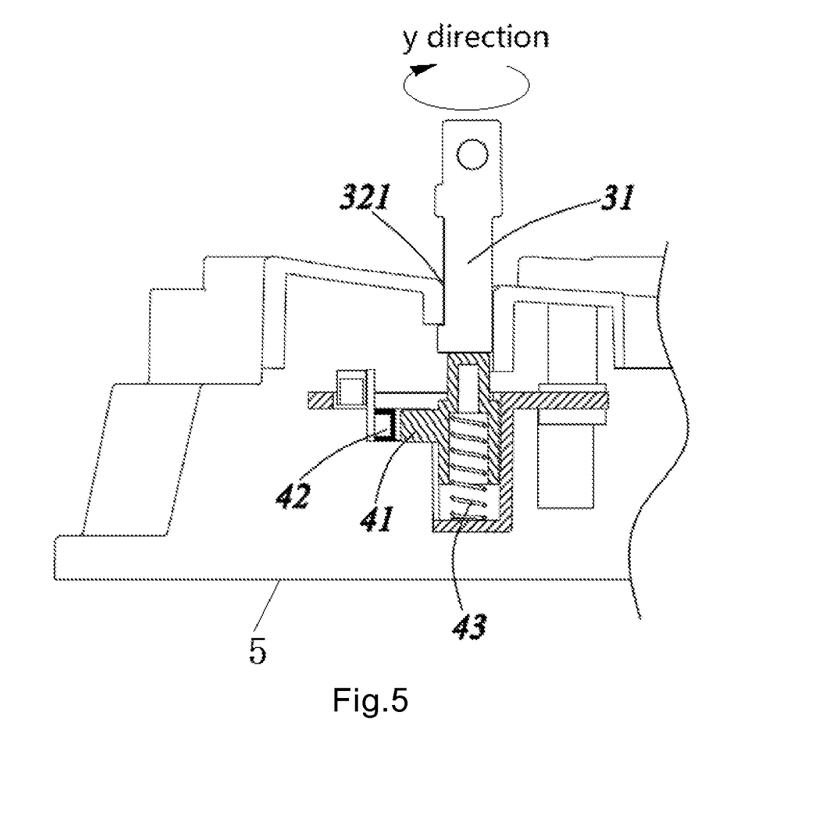
FIG. 5 illustrates an example schematic section view of an example first implementation structure of an example securing assembly in an example first state in the first embodiment.

The plug-in connector 31 may have a first direction of action for insertion into the fixed base 32 and a second direction of action for movement within the fixed base 32, wherein as shown in FIG. 4, the first direction of action may be perpendicular to a reference plane 5, and as shown in FIG. 5, the second direction of action may be parallel with the reference plane 5.

In some embodiments, a working surface for the self-propelled cleaning robot can be used as the reference plane, or a virtual plane parallel with the working surface may be used as the reference plane. Alternatively, a certain plane on the fixed base can be used as the reference plane. Alternatively, a virtual plane having a particular angle (such as 30 degrees, 40 degrees, etc.) with respect to the working surface can be used as the reference plane. Alternatively, a virtual plane perpendicular to the working surface can be used as the reference plane. Other planes similar to and/or functionally analogous to those described above may be implemented.

In these or other embodiments, the first direction of action may be a rectilinear direction, e.g., direction X as shown in FIG. 4. The second direction of action may be a rotational direction, e.g., direction Y as shown in FIG. 5. In these or other embodiments, direction Y as shown in FIG. 5 may be a clockwise rotation direction. Alternatively, the direction Y may also be a counterclockwise rotation direction.

The abutting portion 323 may be arranged in such a way that the abutting portion 323 may block movement of the plug-in connector 31 in the second direction of action when the securing assembly 3 is in the first state.

In some embodiments, the particular structure for the fixed base 32 and the plug-in connector 31 can also be varied, for example, as long as the variation can result in a fixed connection between the self-propelled cleaning robot 1 and the safety guard device.

In particular, the present disclosure includes the following several embodiments in regard to the particular form of the detection assembly 4.

Embodiment 1

As shown in FIG. 2 through FIG. 5, the detection assembly 4 in this embodiment may include a shield 41, a sensor 42 and a first elastic member 43, which may all be arranged within the fixed base 32.

The shield 41 may have an exposure position where the sensor 42 is exposed and a shielding position where the sensor 42 is shielded. The shielding position and the exposure position of the shield 41 may correspond to the first state and the second state, respectively, of the securing assembly 3. That is, as shown in FIG. 5, when the shield 41 is in the shielding position, the sensor 42 may be shielded by the shield 41, and the securing assembly 3 may be in the first state. As shown in FIG. 4, when the shield 41 is in the exposure position, the sensor 42 may not be shielded by the shield 41 but may be exposed, and the securing assembly 3 may be in the second state.

The first elastic member 43 may be positioned between the shield 41 and the fixed base 32, and the plug-in connector 31, when inserted into the fixed base 32, may abut against the shield 41 so as to cause displacement of the shield 41 in an up-and-down direction.

In this embodiment, the shield 41 may be in the exposure position when the securing assembly 3 is in the second state. When the plug-in connector 31 is inserted into the fixed base 32, the abutting block 312 may enter the receding portion 322 to abut against the shield 41 and compress the first elastic member 43. Additionally or alternatively, the plug-in connector 31 may be rotated such that the abutting block 312 may enter the abutting portion 323. The abutting block 312 may be driven by a resilience of the first elastic member 43 to offset upwardly (e.g., a direction opposite to the insertion direction) by a distance. In these or other embodiments, the shield 41 may be in the shielding position that is lower than the exposure position. At this moment, the sensor 42 may be shielded by the shield 41, so it may be determined that the plug-in connector 31 is engaged in place and the securing assembly 3 has entered the first state.

In this embodiment, provided that the sensor 42 is shielded while the plug-in connector 31 abuts against the shield 41 to provide a downward compression, the detection assembly 4 may not determine that the securing assembly 3 is already in the first state due to the short period of time.

Figure 6:
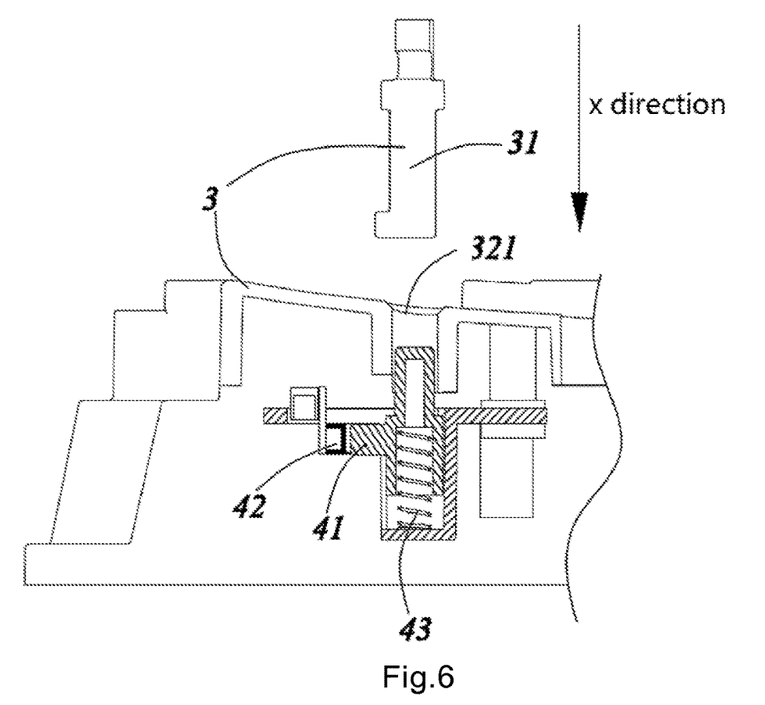
FIG. 6 illustrates an example schematic section view of an example second implementation structure of an example securing assembly in an example second state in the first embodiment.
Figure 7:
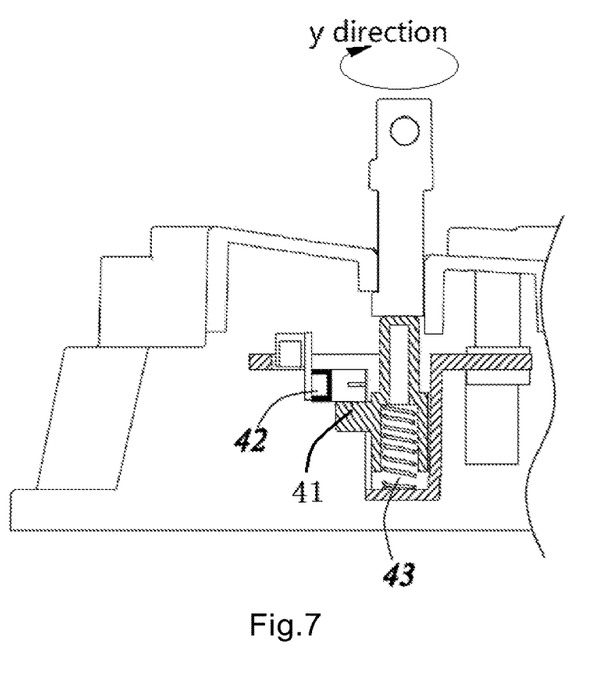
FIG. 7 illustrates an example schematic section view of an example second implementation structure of an example securing assembly in an example first state in the first embodiment.

In some embodiments, the following implementation can be employed. As shown in FIG. 6, when the shield 41 is in the shielding position, the sensor 42 may be shielded by the shield 41 and the securing assembly may be in the second state. As shown in FIG. 7, when the shield 41 is in the exposure position, the sensor 42 may not be shielded by the shield 41 but may be exposed, and the securing assembly may be in the first state.

In the example embodiments of FIG. 4 and FIG. 5 described above, if one or more portions are damaged, the sensor may be mistaken for being shielded, and the securing assembly may be in the first state, and the control unit may control the self-propelled cleaning robot to enter the safe activation state. At this point, a likelihood for the self-propelled cleaning robot to fall off may increase if it is erroneously activated by the user. This example problem, however, can be solved by the solution provided in example embodiments of FIG. 6 and FIG. 7, thereby helping to attain a greater degree of safety.

In practice, one or more sensors 42 may be arranged, and this is not specifically limited by the embodiments of the present disclosure. When a plurality of sensors 42 may be arranged, the number of structures (such as blocking pieces) on the shield 41 that play a role of shielding may be the same as or similar to the number of those sensors, and also these structures may correspond to the sensors with respect to position. For example, two sensors may be fixed within the fixed base: a first sensor and a second sensor. Correspondingly, two shielding structures (such as two blocking pieces) may be arranged on the shield: a first shielding structure and a second shielding structure. The first shielding structure and the second shielding structure may move in a corresponding manner (e.g., synchronously) to shield or expose (e.g., simultaneously) the first sensor and the second sensor, respectively. More or fewer sensors may be implemented according to these and/or other embodiments of the present disclosure.

Figure 3:
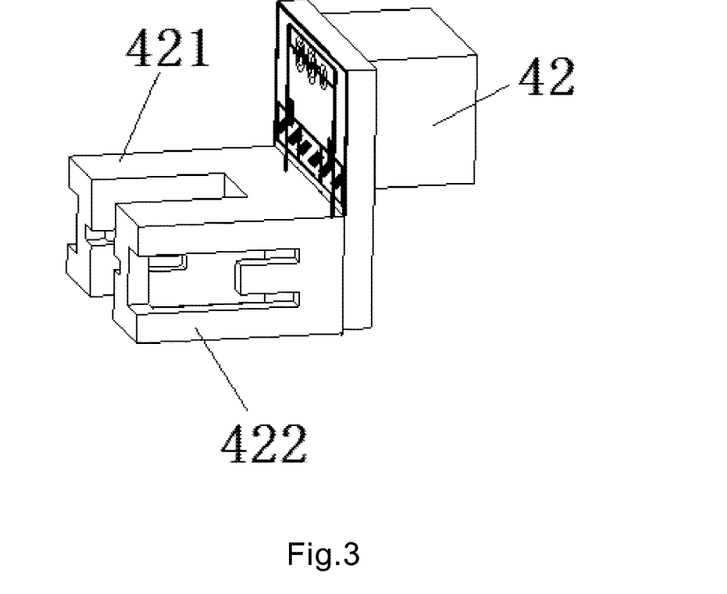
FIG. 3 illustrates an example schematic view illustrating an implementation structure of an example sensor in the first embodiment.

In some embodiments, the sensor 42 may be a photocoupler, which, as shown in FIG. 3, may include a light-emitting end 421 and a light-receiving end 422 arranged opposite each other. The shield 41 may extend into the space between the light-emitting end 421 and the light-receiving end 422 so that the light-emitting end 421 and the light-receiving end 422 may be blocked off, in which case it can be determined that the photocoupler is shielded by the shield 41. After the shield 41 retracts from the light-emitting end 421 and the light-receiving end 422, the light-emitting end 421 and the light-receiving end 422 may be communicated, in which case it can be determined that the photocoupler is not shielded by the shield 41.

Embodiment 2

Figure 8:
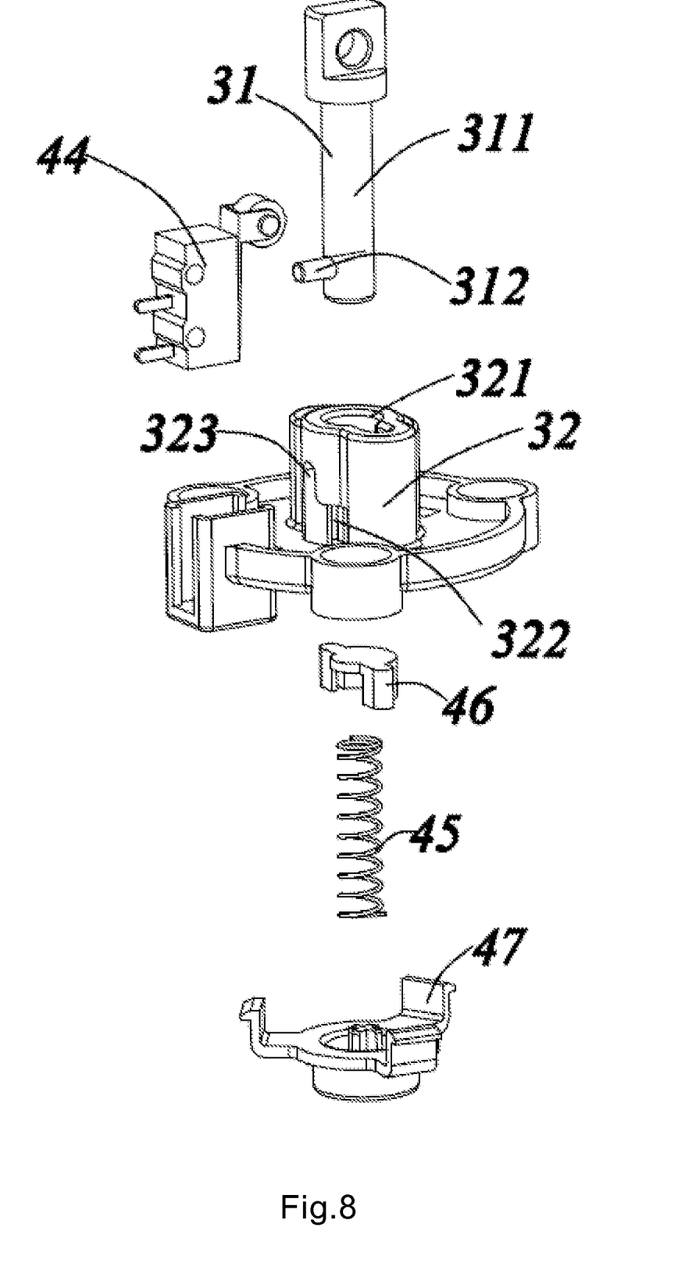
FIG. 8 illustrates an example structural schematic view illustrating an example securing assembly and an example detection assembly in an example second embodiment.

As shown in FIG. 8, the detection assembly 4 in this embodiment may include a microswitch 44, a second elastic member 45 for abutting against the plug-in connector 31, a cap 46 arranged between the plug-in connector 31 and the second elastic member 45, and a fixed frame 47 arranged on a side of the second elastic member 45 away from the plug-in connector 31 and used to position the second elastic member 45.

When the plug-in connector 31 is inserted into the fixed base 32, the abutting block 312 may enter the receding portion 322 and may compress the second elastic member 45. Additionally or alternatively, the plug-in connector 31 may be rotated such that the abutting block 312 may enter the abutting portion 323. The abutting block 312 may be driven by a resilience of the second elastic member 45 to offset upwardly (e.g., a direction opposite to the insertion direction). Afterwards, the microswitch 44 may be triggered.

Upon triggering of the microswitch 44, it may be determined that the plug-in connector 31 is engaged in place and the securing assembly 3 has entered the first state.

Embodiment 3

Figure 9:
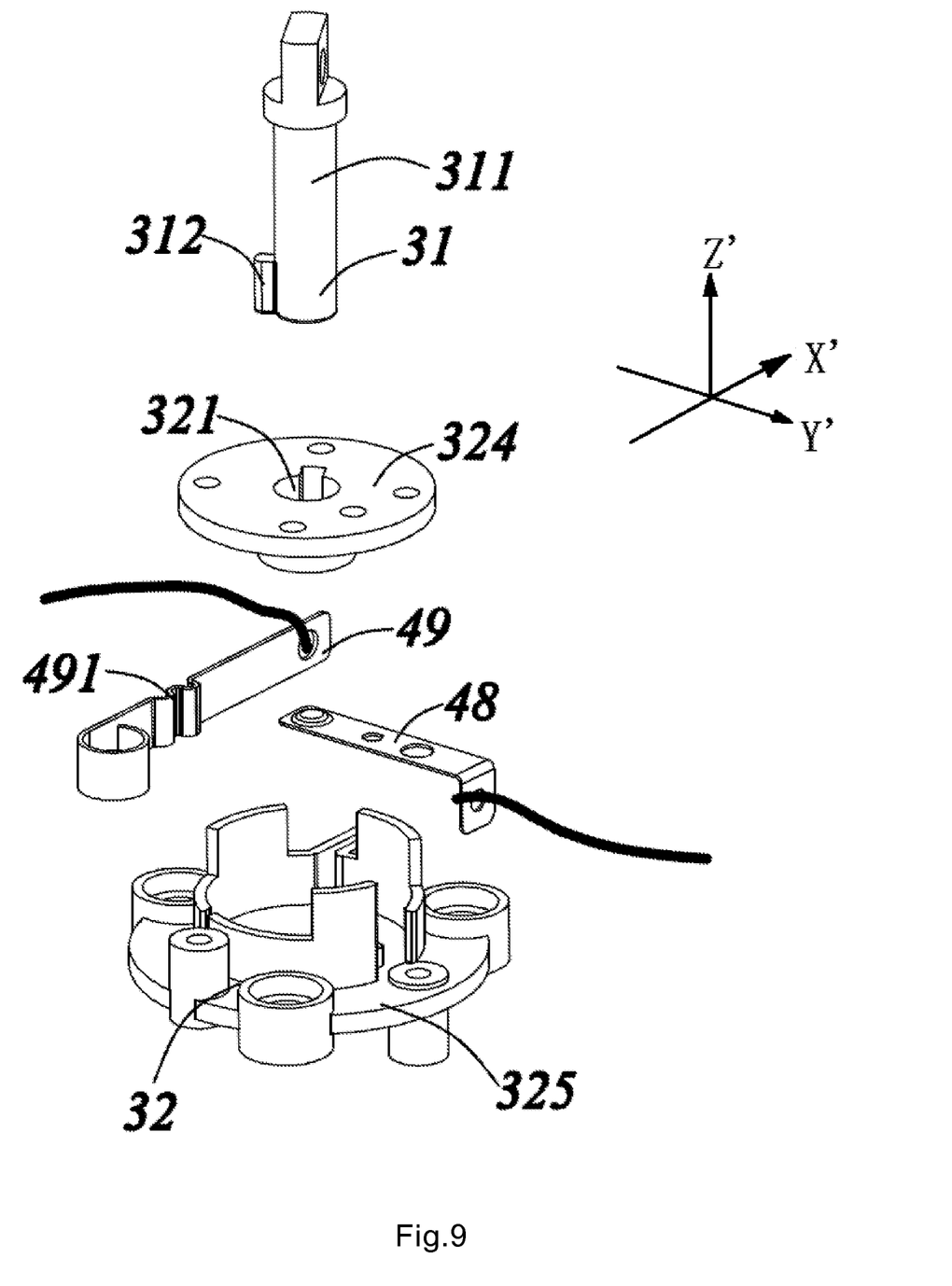
FIG. 9 illustrates an example structural schematic view illustrating an example securing assembly and an example detection assembly in an example third embodiment.

As shown in FIG. 9, the detection assembly 4 may include a first wiring board 48 and a second wiring board 49 arranged to be spaced from each other. In these or other embodiments, the plug-in connector 31 made include a conductive material and may simultaneously (e.g., near simultaneously) come into contact with the first wiring board 48 and the second wiring board 49 when the securing assembly 3 is in the first state. In some embodiments, an insulator can be added into the gap between the first wiring board 48 and the second wiring board 49, for example, to further improve a working reliability of the multimedia intelligent cleaning system.

When the securing assembly 3 is in the first state, a first position of the securing assembly 3 may be electrically connected with the first wiring board 48 and a second position of the securing assembly 3 may be electrically connected with the second wiring board 49. In these or other embodiments, the first position and the second position may be two different positions on the securing assembly.

For instance, as shown in FIG. 9, the first wiring board 48 may be arranged below (e.g., directly below) the insertion opening 321 and may extend along a horizontal direction (e.g., the plane of axis X' and axis Y' in a coordinate system of X'Y'Z' in FIG. 9), and the second wiring board 49 may extend along a vertical direction (e.g., the plane of axis Z' and axis X' in a coordinate system of X'Y'Z' in FIG. 9). The second wiring board 49 may be formed thereon with a clamping connector 491 that is used for cooperation with the abutting block 312. When the plug-in connector 31 is inserted into the fixed base 32, the abutting block 312 may be inserted from the insertion opening 321 and may abut against the first wiring board 48. Additionally or alternatively, the plug-in connector 31 may be rotated such that the abutting block 312 may cooperate with the clamping connector 491. In these or other embodiments, the first wiring board 48 and the second wiring board 49 may be switched on by use of the plug-in connector 31. In some embodiments, it may then be determined that the plug-in connector 31 is engaged in place and the securing assembly 3 has entered the first state.

Figure 10:
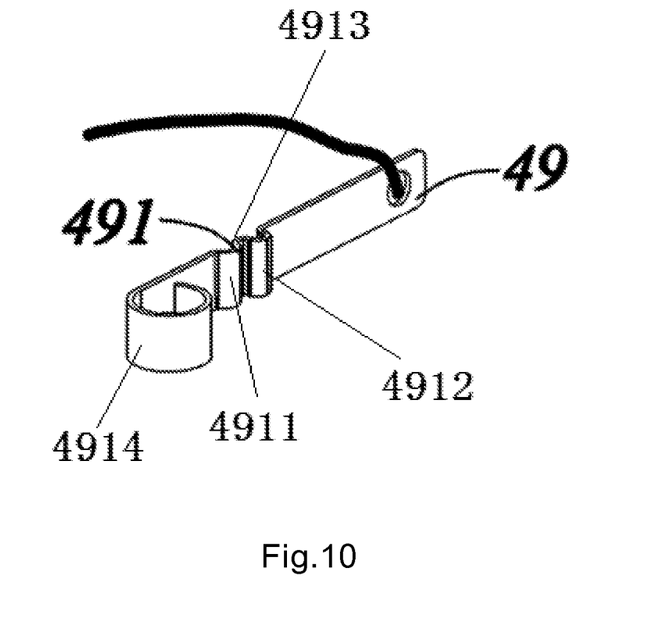
FIG. 10 illustrates an example structural schematic view illustrating an example second wiring board in the third embodiment.

Specifically as shown in FIG. 10, the clamping connector 491 is of a wavelike structure formed on the second wiring board 49. This wavelike structure may have two peaks 4912 and 4913 as well as a valley 4913 located between the two peaks 4912 and 4913. When the plug-in connector 31 is rotated, the abutting block 312 may squeeze through one of the two peaks 4912 and 4913 into the valley 4913, and may remain in the valley 4913 such that the abutting block 312 may cooperate with the clamping connector 491 to accomplish an electrical connection between the securing assembly 3 and the second wiring board 49.

In this embodiment, as shown in FIG. 9, the fixed base 32 may include a flange plate 324 and a fixed support 325, and the insertion opening 321 may be arranged on the flange plate 324. The first wiring board 48 and the second wiring board 49 may be positioned between the flange plate 324 and the fixed support 325. The plug-in connector 31 may be inserted into the insertion opening along the first direction of action (e.g., the direction of axis Z' shown in the figure), and the bottom surface of the plug-in connector 31 may be electrically connected with the first wiring board 48. Additionally or alternatively, the plug-in connector 31, when being electrically connected with the first wiring board 48, may move along the second direction of action (e.g., the counterclockwise or clockwise rotation direction that uses the axis Z' as an axis of rotation) to such an extent that the abutting block 312 may be electrically connected with the second wiring board 49. Thus, in some embodiments, the plug-in connector 31 may cooperate with and affix to the fixed base.

Figure 11:
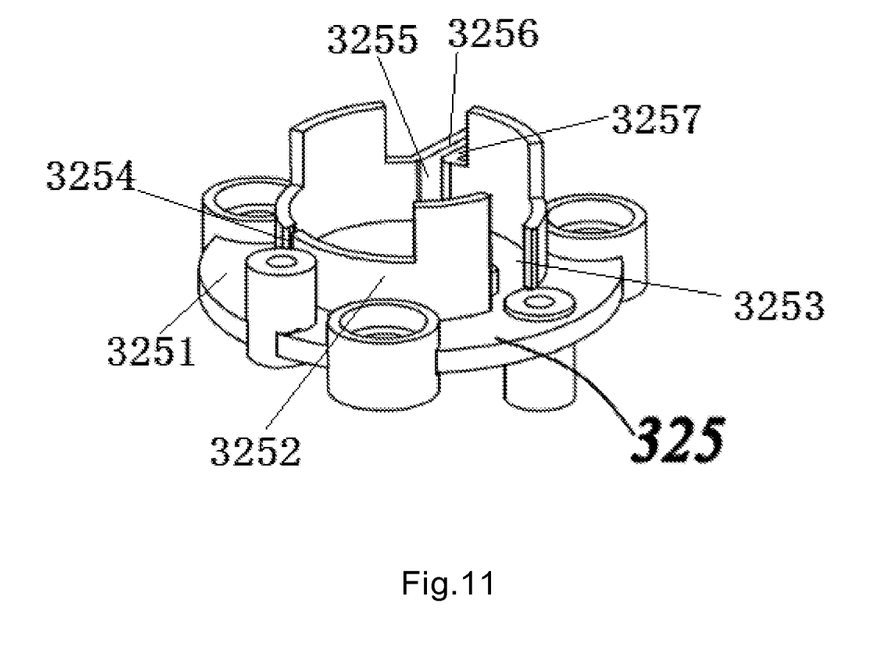
FIG. 11. illustrates an example structural schematic view illustrating an example fixed base in the third embodiment.

In a specific implementation, as shown in FIG. 11, the fixed support 325 may include a mounting surface 3251. With reference to FIG. 9, the first wiring board 48 may be parallel with the mounting surface 3251, and the second wiring board 49 may be perpendicular to the mounting surface 3251. With continued reference to FIG. 11, the fixed support 325 also may include an annular sidewall 3252 extending from the mounting surface 3251 along a direction towards the flange plate 324. In these or other embodiments, a first opening 3253 may be formed on the annular sidewall 3252. In some embodiments, the first wiring board 48 may be partially disposed within the annular sidewall 3252 by extending into the annular sidewall 3252 through the first opening 3253, and may be partially positioned outwardly of the annular sidewall 3252. In some embodiments, a second opening 3254 and a third opening 3255 may be also formed on the annular sidewall 3252. Additionally or alternatively, the second wiring board 49 may enter into the annular sidewall 3252 through the second opening 3254 and may then extend out of the annular sidewall 3252 through the third opening 3255, such that both ends of the second wiring board 49 may be positioned outwardly of the annular sidewall 3252 and a middle portion thereof is positioned inwardly of the annular sidewall 3252.

Arranged on a first end of the second wiring board 49 may be a blocking structure for blocking entrance of the first end into the annular sidewall 3252. The blocking structure may be a curled structure 4914 that may be formed by curling of the end of the second wiring board shown in FIG. 10. Additionally or alternatively, the blocking structure may be a twisted structure that may be formed by twisting of the end of the second wiring board 49. Other structures similar to and/or functionally analogous to those described above may be implemented.

Further, two retaining walls 3256 and 3257 may be arranged outwardly of the annular sidewall, and a space corresponding with the second wiring board 49 may be formed between the two retaining walls 3256 and 3257. The space may be communicated with the third opening 3255. The second wiring board 49 may enter the space through the third opening 3255 and may keep, within the space, a relative position relationship with the fixed base 325. In this manner, the reliability of the electrical connection between the second wiring board 49 and the securing assembly 3 may be improved.

Also provided in the embodiments of the present disclosure is a control method of the multimedia intelligent cleaning system. The embodiment of this method may be implemented in the multimedia intelligent cleaning system of one or more embodiments of the present disclosure. In particular, the control method of the multimedia intelligent cleaning system may include: controlling, by the control unit, entrance of the self-propelled cleaning robot into a safe activation state if the detection unit detects that the securing assembly is in the first state.

Further, if the detection unit detects that the securing assembly is in the second state, then the control unit may control entrance of the self-propelled cleaning robot into a non-activation state.

In some structures described in one or more of the embodiments described above, such as the implementation of the detection assembly provided in embodiment 1, the plug-in connector in the securing assembly may shield the sensor while abutting against the shield and may provide a downward compression. However, at this moment it may not be determined that the securing assembly may have proceeded to the first state. As a result, the method provided in the embodiments of the present disclosure, e.g., controlling, by the control unit, entrance of the self-propelled cleaning robot into a safe activation state if the detection unit detects that the securing assembly is in the first state, may include one or more of the following blocks (e.g., steps). Although described as discrete blocks, various blocks may be divided into additional blocks, combined into fewer blocks, or eliminated, depending on the desired implementation.

At block 101, the control unit may wait for a first time period upon the first receipt of a detection signal that the detection unit detects that the securing assembly is in the first state. The first time period may be a set value, such as about 5 seconds, about 15 seconds, about 30 seconds, etc.

At block 102, controlling may include controlling, by the control unit, entrance of the self-propelled cleaning robot into a safe activation state when, within the first time period, the detection unit detects that the securing assembly is always in the first state. For example, according to the control method of the present disclosure, the self-propelled cleaning robot can enter the safe activation state upon expiration of the first time period, thereby helping to avoid or mitigate erroneous operations by the user or outside forces and also help improve the working reliability of the self-propelled cleaning robot.

In accordance with the multimedia intelligent cleaning system and the control method thereof in the present disclosure, the risk of falling that may stem from a loose connection between the safety guard device and the self-propelled cleaning robot 1 can be reduced by arranging the detection assembly 4 to detect the state of the securing assembly 3 and also by utilizing the control unit to control depending on detection results, whether the self-propelled cleaning robot 1 enters the safe activation state. The multimedia intelligent cleaning system in the present disclosure may thus improve intelligence and/or safety of cleaning systems described herein.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A multimedia intelligent cleaning system, comprising:
   a self-propelled cleaning robot for cleaning a working surface;

a safety guard connector to connect with the self-propelled cleaning robot,
wherein the self-propelled cleaning robot and the safety guard connector are detachably connected with each other through a securing connector assembly, and
wherein the securing connector assembly has a first state in which the safety guard connector is connected with the self-propelled cleaning robot and a second state in which the safety guard connector is separated from the self-propelled cleaning robot;
a detector assembly to detect whether the securing connector assembly is in the first state or the second state; and
a control unit to control whether the self-propelled cleaning robot enters a safe activation state depending on a detection signal from the detector assembly.

2. The multimedia intelligent cleaning system according to claim 1, wherein:
the securing connector assembly comprises a plug-in connector fixedly connected with the safety guard connector and a fixed base arranged within the self-propelled cleaning robot;
the plug-in connector and the fixed base cooperate with each other and are fixed when the securing connector assembly is in the first state; and
the plug-in connector and the fixed base are separated from each other when the securing connector assembly is in the second state.

3. The multimedia intelligent cleaning system according to claim 2, wherein:
the plug-in connector has a first direction of action for insertion into the fixed base and a second direction of action for movement within the fixed base;
the first direction of action is perpendicular to a reference plane; and
the second direction of action is parallel with the reference plane.

4. The multimedia intelligent cleaning system according to claim 3, wherein:
the reference plane is parallel with the working surface; or
the reference plane is perpendicular to the working surface.

5. The multimedia intelligent cleaning system according to claim 3, wherein the fixed base is provided thereon with an abutting portion that is arranged in such a way that the abutting portion blocks movement of the plug-in connector in the second direction of action when the securing connector assembly is in the first state.

6. The multimedia intelligent cleaning system according to claim 2, wherein the plug-in connector comprises a plug-in rod with one end being fixed with the safety guard connector and an abutting block located on the other end of the plug-in rod and extending radially outwards along the plug-in rod.

7. The multimedia intelligent cleaning system according to claim 6, wherein an insertion opening for insertion of the plug-in rod and the abutting block is formed on the fixed base.

8. The multimedia intelligent cleaning system according to claim 7, further comprising:
a receding portion communicated with the insertion opening to make way for the abutting block when the plug-in connector is inserted, and
an abutting portion communicated with and radially spaced a certain distance from the receding portion are formed on the fixed base, the abutting portion arranged in such a way that when the securing connector assembly is in the first state, the abutting block cooperates with the abutting portion to fix the plug-in connector.

9. The multimedia intelligent cleaning system according to claim 8, wherein the detector assembly comprises a microswitch arranged in such a way that the microswitch is triggered when the abutting block cooperates with the abutting portion.

10. The multimedia intelligent cleaning system according to claim 8, wherein:
the detector assembly comprises a shield and a sensor arranged within the fixed base;
the shield has an exposure position at which the sensor is exposed and a shielding position at which the sensor is shielded; and
the shielding position and the exposure position of the shield correspond to the first state and the second state, respectively, of the securing connector assembly.

11. The multimedia intelligent cleaning system according to claim 10, wherein:
the detector assembly further comprises an elastic member, the elastic member is positioned between the shield and the fixed base; and
the plug-in connector, when inserted into the fixed base, abuts against the shield so as to cause displacement of the shield.

12. The multimedia intelligent cleaning system according to claim 2, wherein:
the detector assembly comprises a first wiring board and a second wiring board arranged to be spaced from each other; and
the plug-in connector is made of a conductive material and is simultaneously electrically connected with the first wiring board and the second wiring board when the securing connector assembly is in the first state.

13. The multimedia intelligent cleaning system according to claim 12, wherein:
when the securing connector assembly is in the first state, a first position of the securing connector assembly is electrically connected with the first wiring board;
when the securing connector assembly is in the first state, a second position of the securing connector assembly is electrically connected with the second wiring board; and
the first position and the second position are two different positions on the securing connector assembly.

14. The multimedia intelligent cleaning system according to claim 12, wherein:
the securing connector assembly comprises a plug-in connector fixedly connected with the safety guard connector and a fixed base arranged within the self-propelled cleaning robot;
the plug-in connector and the fixed base cooperate with each other and are fixed when the securing connector assembly is in the first state, and the plug-in connector and the fixed base are separated from each other when the securing connector assembly is in the second state;
the fixed base comprises a flange plate and a fixed support, an insertion opening being arranged on the flange plate, and the first wiring board and the second wiring board are positioned between the flange plate and the fixed support;
the plug-in connector is inserted into the insertion opening along a first direction of action and electrically connected with the first wiring board; and
the plug-in connector, when being electrically connected with the first wiring board, moves along a second direction of action to be electrically connected with the second wiring board, and is fixed with the fixed base.

15. The multimedia intelligent cleaning system according to claim 14, wherein:
the fixed support has a mounting surface;
the first wiring board is parallel with the mounting surface; and
the second wiring board is perpendicular to the mounting surface.

16. The multimedia intelligent cleaning system according to claim 15, wherein:
the fixed support has an annular sidewall extending from the mounting surface along a direction towards the flange plate;
a first opening is formed on the annular sidewall, the first wiring board being partially disposed within the annular sidewall through the first opening and partially positioned outwardly of the annular sidewall; and
a second opening and a third opening are formed on the annular sidewall, the second wiring board entering into the annular sidewall through the second opening and extending out of the annular sidewall through the third opening, such that both ends of the second wiring board are positioned outwardly of the annular sidewall and a middle portion thereof is positioned inwardly of the annular sidewall.

17. The multimedia intelligent cleaning system according to claim 16, further comprising, arranged on a first end of the second wiring board is a blocking structure configured to block entrance of the first end into the annular sidewall.

18. The multimedia intelligent cleaning system according to claim 16, further comprising:
two retaining walls are arranged outwardly of the annular sidewall; and
a space corresponding with the second wiring board is formed between the two retaining walls, the space being communicated with the third opening.

19. A control method of the multimedia intelligent cleaning system according to claim 1 comprising:
controlling, by the control unit, entrance of the self-propelled cleaning robot into a safe activation state if the detector assembly detects that the securing connector assembly is in the first state.

20. The method according to claim 19, wherein detecting that the securing connector assembly is in the first state comprises:
waiting, by the control unit, for a first time period upon a first receipt of a detection signal that the detector assembly detects that the securing connector assembly is in the first state; and
controlling, by the control unit, entrance of the self-propelled cleaning robot into a safe activation state when, within the first time period, the detector assembly detects that the securing connector assembly is always in the first state.

* * * * *